D. B. STEVENSON.
UTENSIL HANDLE.
APPLICATION FILED FEB. 11, 1911.
1,022,978.
Patented Apr. 9, 1912.
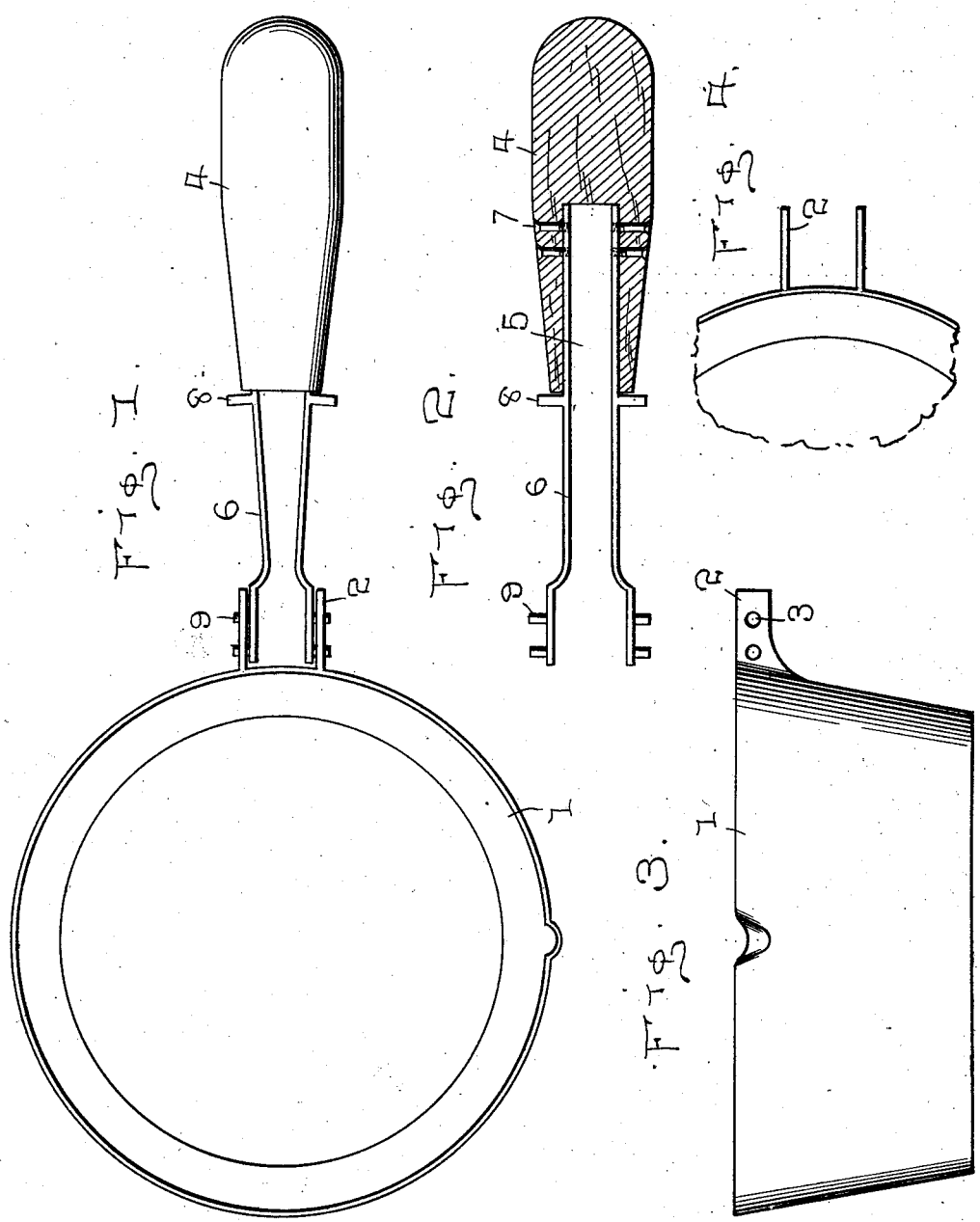

UNITED STATES PATENT OFFICE.

DAVID B. STEVENSON, OF RANKIN, PENNSYLVANIA.

UTENSIL-HANDLE.

1,022,978.  Specification of Letters Patent.  Patented Apr. 9, 1912.

Application filed February 11, 1911. Serial No. 608,095.

*To all whom it may concern:*

Be it known that I, DAVID B. STEVENSON, a citizen of the United States, residing at Rankin, in the county of Allegheny and State of Pennsylvania, have invented certain new and useful Improvements in Utensil-Handles; and I do hereby declare the following to be a full, clear, and exact description of the invention, such as will enable others skilled in the art to which it appertains to make and use the same.

My invention relates to new and useful improvements in utensil handles and more particularly to a removable handle, which may be readily secured to or removed from the body of a utensil.

The object of my invention is to provide a handle which may be attached to a utensil without the use of tools.

Other objects and advantages of my invention will be hereinafter set forth in the specification and pointed out in the claims.

In the accompanying drawings I have shown the preferred form which my invention may take.

In said drawings, Figure 1 is a top plan view of a utensil having my improved form of handle attached thereto. Fig. 2 is a longitudinal sectional view through the handle. Fig. 3 is a side elevation of the utensil used with my preferred form of handle, and, Fig. 4 is a detail view showing a portion of the utensil.

Referring to the drawings in which similar reference numerals designate corresponding parts throughout the several views, 1 is a utensil of the usual or any preferred construction, which is provided on its outer surface at its upper end with a pair of parallel extensions 2. Each of the extensions 2 is provided with apertures 3 for a purpose to be hereinafter more clearly set forth.

In order that the utensil 1 may be readily lifted and moved from place to place, I provide a removable handle 4. The handle 4 may be formed of wood or any other desired suitable material. Said handle 4 is provided with a longitudinal bore 5 in which is adapted to be secured a pair of oppositely disposed members 6. The inner ends of the members 6 are secured to the handle 4 in any desired manner. In the drawing I have shown said members secured to the handle by means of screws 7, which take through the handle and engage the ends of the members 6. The outer ends of the members 6 are preferably spaced-apart, the extreme ends of said members being arranged parallel and provided with lugs or extensions 9. In order that the members 6 may be readily operated, I preferably provide the same with outwardly extending projections or lugs 8, which may be engaged by the fingers of the operator to move said members toward one another.

The lugs 9 are arranged to coöperate with the apertures 3 formed in the extensions 2 on the utensil. While I have shown the use of a pair of lugs 9 adapted to coöperate with a pair of apertures 3, it will be understood that I may employ any number of coöperating lugs and apertures and that the apertures may be arranged horizontally from the utensil or at an angle thereto.

When it is desired to lift the utensil shown in Fig. 3, the lugs 8 are pressed to force the outer ends of the members 6 toward one another and the ends positioned between the extensions 2, when the members are allowed to spring outwardly so that the lugs 9 extend into the apertures 3. The utensil may then be lifted by the handle and moved to any position desired. When it is desired to remove the handle from the utensil, it is only necessary to reverse the above described operation.

While I have shown and described the extensions on the utensil as being provided with apertures and the spring members of the handle as being provided with extensions adapted to coöperate with said apertures, I desire it to be understood that the extensions may be provided with lugs and the spring members provided with coöperating apertures.

It will be seen that I have provided a utensil and handle which may be readily connected or disengaged from one another. It will further be seen that I have provided a handle consisting of but few parts, which may be very cheaply and easily constructed.

What I claim is:

1. The combination with a utensil having a pair of extensions projecting therefrom, each extension having a plurality of apertures in line with each other therein, of a lifting device comprising a handle portion, a pair of spring members spaced apart and secured to said handle and extending outwardly therefrom and a plurality of lugs adjacent the free ends of said spring members, said lugs being in line with each other and with the apertures in the extensions of the utensil.

2. The combination with a utensil having a pair of extensions projecting therefrom, said extensions having a plurality of openings in line with each other, of a lifting device comprising a handle, having a longitudnally extending bore in one end thereof, a pair of spring members spaced apart and entering said bore, means to anchor the ends of the spring members in the bore and a plurality of outwardly projecting lugs at the free ends of the spring members, said lugs being in line with each other and in line with the openings in said extensions.

3. The combination with a utensil and a pair of extensions on said utensil, said extensions having a plurality of openings in line with each other, of a lifting device comprising a handle, having a longitudinally extending bore at one end, a pair of spring members spaced apart and having their inner ends entered and secured in said bore, a plurality of outwardly extending lugs at the free ends of said spring members, said lugs being in line with each other and with the openings in the extensions and a pair of operating lugs on the spring members adjacent the end of the handle to receive pressure to release the first mentioned lugs from the extensions.

In testimony whereof I have signed my name to this specification in the presence of two subscribing witnesses.

DAVID B. STEVENSON.

Witnesses:
  FRANK J. AMOREAU,
  BLANCHE McCULLOUGH.

---

Copies of this patent may be obtained for five cents each, by addressing the "Commissioner of Patents, Washington, D. C."